US012732794B2

(12) United States Patent
Dietze

(10) Patent No.: US 12,732,794 B2
(45) Date of Patent: Sep. 8, 2026

(54) eUICC PROVISIONING AND NOTIFICATION HANDLING THEREIN

(71) Applicant: Giesecke+Devrient ePayments GmbH, Munich (DE)

(72) Inventor: Claus Dietze, Obersochering (DE)

(73) Assignee: GIESECK+DEVRIENT EPAYMENTS GMBH, Munich (DE)

( * ) Notice: Subject to any disclaimer, the term of this patent is extended or adjusted under 35 U.S.C. 154(b) by 283 days.

(21) Appl. No.: 18/364,645

(22) Filed: Aug. 3, 2023

(65) Prior Publication Data

US 2024/0048958 A1 Feb. 8, 2024

(30) Foreign Application Priority Data

Aug. 8, 2022 (EP) .................................... 22020381

(51) Int. Cl.
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
CPC ....... H04W 8/183; H04W 8/205; H04W 4/50; H04W 4/70; H04W 4/80; H04W 8/24; H04W 88/02; H04W 8/245; H04W 8/18; H04W 12/37; H04W 4/12; H04W 8/22
See application file for complete search history.

(56) References Cited

U.S. PATENT DOCUMENTS

| | | | | |
|---|---|---|---|---|
| 11,064,352 | B2 * | 7/2021 | Yang | H04W 8/245 |
| 2018/0212946 | A1 * | 7/2018 | Nix | H04L 63/101 |
| 2019/0058989 | A1 * | 2/2019 | Park | H04W 8/205 |
| 2019/0141002 | A1 * | 5/2019 | Balasubramanian | H04W 4/50 |
| 2019/0306697 | A1 * | 10/2019 | Veneroso | H04W 4/50 |
| 2020/0314638 | A1 | 10/2020 | Veneroso | |

(Continued)

FOREIGN PATENT DOCUMENTS

| | | | | |
|---|---|---|---|---|
| EP | 3713261 A1 * | 9/2020 | | H04W 52/0238 |
| JP | 2021086460 A * | 6/2021 | | |
| WO | WO-2018045817 A1 * | 3/2018 | | H04W 12/0433 |

OTHER PUBLICATIONS

SGP.02, "Remote Provisioning Architecture for Embedded UICC Technical Specification, Version 4.2", GSM Association, Jul. 7, 2020.

(Continued)

*Primary Examiner* — Lana N Le
(74) *Attorney, Agent, or Firm* — Workman Nydegger

(57) ABSTRACT

A method of providing to a remote entity a Notification referring to a profile download to an eUICC, includes the following steps: downloading a profile to the eUICC from a Personalization Equipment, wherein the Personalization Equipment is constructed to effect or to support: to provision eUICCs by one or several of: downloading profiles, installing downloaded profiles in eUICCs or supporting such installing, and personalizing eUICCs and/or profiles downloaded to eUICCs or supporting such personalizing; after the profile download, generating at least one Notification referring to the profile download; providing the generated at least one Notification for sending it to a remote entity; generating and providing the at least one Notification at the Personalization Equipment.

20 Claims, 1 Drawing Sheet

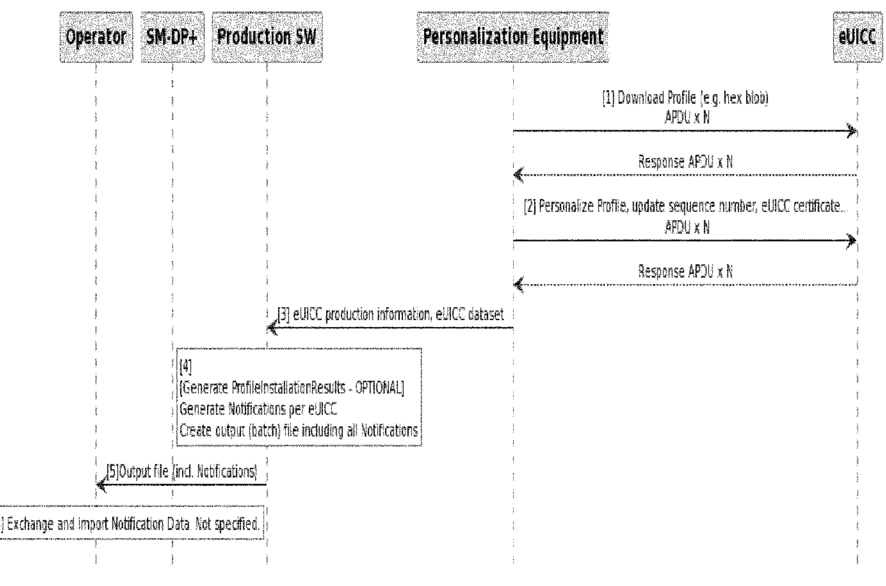

(56) References Cited

U.S. PATENT DOCUMENTS

| | | | | |
|---|---|---|---|---|
| 2020/0351656 | A1* | 11/2020 | Johansson | H04W 4/70 |
| 2020/0374686 | A1* | 11/2020 | Zhang | H04W 8/18 |
| 2021/0392490 | A1* | 12/2021 | Indurkar | H04W 8/183 |
| 2023/0262450 | A1* | 8/2023 | Kang | H04W 8/183<br>455/419 |
| 2023/0300596 | A1* | 9/2023 | Salmela | H04W 8/18<br>455/410 |
| 2024/0314538 | A1* | 9/2024 | Ståhl | H04W 8/183 |
| 2024/0314549 | A1* | 9/2024 | Mayalil | H04W 8/205 |

OTHER PUBLICATIONS

SGP.22 v2.2.2, "RSP Technical Specification Version 2.2.2", GSM Association, Jun. 5, 2020.
SGP.22 v3.0, "RSP Technical Specification Version 3.0", GSM Association, Oct. 19, 2022.
SGP.31, "eSIM IoT Architecture and Requirements Version 1.0", GSM Association, Apr. 19, 2022.
SGP.32, "eSIM IoT Technical Specification Version 1.0.1", GSM Association, Jul. 4, 2023.
Extended European Search Report from Corresponding European Patent Application No. EP22020381.4, Jan. 27, 2023.

* cited by examiner

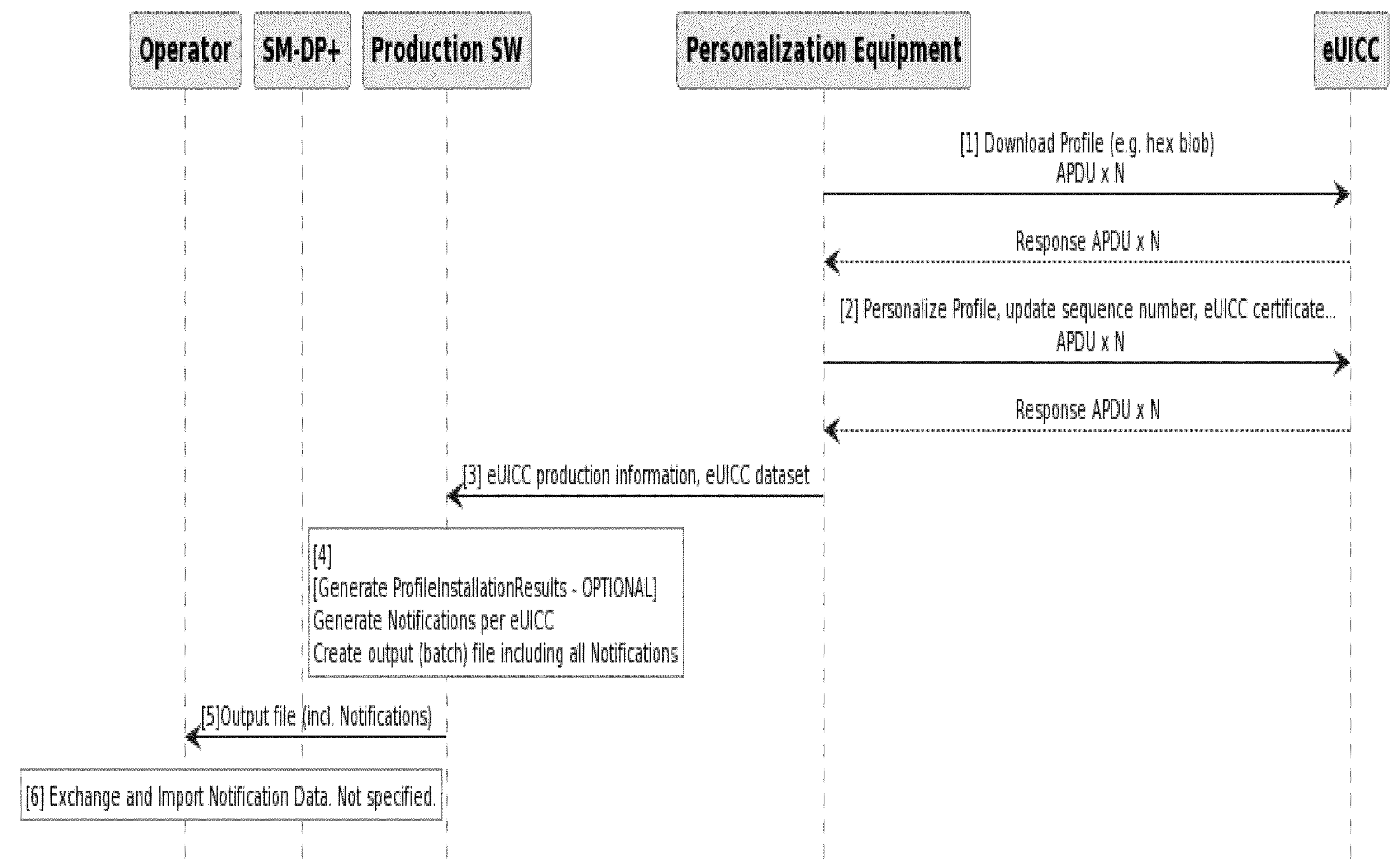

Operator
SM-DP+
Production SW
Personalization Equipment
eUICC
[1] Download Profile (e.g. hex blob)
APDU x N
Response APDU x N
[2] Personalize Profile, update sequence number, eUICC certificate...
APDU x N
Response APDU x N
[3] eUICC production information, eUICC dataset
[4]
[Generate ProfileInstallationResults - OPTIONAL]
Generate Notifications per eUICC
Create output (batch) file including all Notifications
[5]Output file (incl. Notifications)
[6] Exchange and Import Notification Data. Not specified.

eUICC PROVISIONING AND NOTIFICATION HANDLING THEREIN

FIELD OF THE INVENTION

The present invention relates to provisioning of embedded universal integrated circuit cards, eUICCs, understood to be any type of subscriber identity module, SIM, such as an embedded universal integrated circuit card, eUICC, according to any GSMA specifications, particularly GSMA [5] SGP.02, [1] SGP.22, [3] SGP.31. Particularly, the invention relates to notification handling in connection with eUICC provisioning.

BACKGROUND OF THE INVENTION AND PRIOR ART

Mobile devices, understood as devices able to communicate in a mobile network, host an eUICC holding one or several profiles enabling authentication of the mobile station, including the mobile device and the eUICC, in a mobile network. A profile is owned by an Operator or Mobile Network Operator MNO, whose mobile network shall be the Home Network of the profile when used in the field. Document [1] [SGP.22] GSMA SGP.22 RSP Technical Specification Version 2.2.2, 5 Jun. 2020, refers to provisioning of consumer mobile devices such as smartphones and tablet PCs. Document [5] [SGP.02] SGP.02—Remote Provisioning Architecture for Embedded UICC Technical Specification, Version 4.2, 7 Jul. 2020, refers to provisioning of M2M mobile devices, including Automotive mobile devices. Document [3] [SGP.31] GSMA SGP.31 eSIM IoT Architecture and Requirements Version 1.0, 19 Apr. 2022, refers to eSIMs desgined for an Internet of Things, IoT, environment, and to provisioning of such IoT eSIMs.

Provisioning is understood as the entire procedure of downloading and installing profiles from a profile server to an eUICC, including accompanying initiation and authentication procedures, as required or prescribed by standards.

Document [1] [SGP.22] GSMA SGP.22 RSP Technical Specification Version 2.2.2, 5 Jun. 2020, chapter 3, describes remote provisioning of eUICCs of consumer devices. Chapter 3.1.1 describes Profile Download Initiation between an End-User scheduled as user of the mobile device, eUICC and profile, an Operator, also called Mobile Network Operator MNO, and a profile server SM-DP+. Chapter 3.1.2 describes Common Mutual Authentication between the eUICC, a Local Profile Assistant hosted in the device or in the eUICC, and a server SM-XX, which can for example be a profile server SM-DP+. Chapter 3.1.3 Profile Download and Installation describes the procedure of download and installation of a profile from a profile server SM-DP+ to an eUICC.

After a profile has been downloaded from a profile server like SM-DP+ to an eUICC, and after the profile has been installed in the eUICC, and as/if required after the profile has been personalized, reports, also referred to as Notifications, are exchanged between involved instances or entities, to notify of successful download and installation of the profile, or of fail-ures.

Document [1] [SGP.22], chapter 3.5, describes a Notification as report to a remote entity (Recipient Address) that a Profile Management Operation is successfully performed on the eUICC.

Further according to document [1] [SGP.22], chapter 3.1.3.2 “Sub-procedure Profile Down-load and Installation—Download Confirmation”, particularly referring to FIG. 13: “Sub-procedure Profile Download and Installation—Download Confirmation”, steps 8 and 10, the profile server SM-DP+ sends a Notification to the Operator (server), depending on the achieved Profile Download Progress, and depending on the corresponding data and signatures the SM-DP+ receives from the eUICC via the Local Profile Assistant LPA. According to step 8, in case of a failure, the SM-DP+ sends a corresponding Notification to the Operator (server), which is usually the Operator owning the downloaded profile. According to step 10, in case of successful profile download to the eUICC, the SM-DP+ sends to the Operator (server) a corresponding Notification, which includes a signed data structure and signature prepared by the eUICC according to step 3 of chapter 3.1.3.2, and provided from the eUICC to the SM-DP+ via the LPA. According to chapter 3.1.3.3 Sub-procedure Profile Installation, particularly referring to FIG. 14, in step 7, the Local Profile Assistant LPA sends a Notification about the Profile Installation Result, which was previously generated by the eUICC, to the profile server SM-DP+, which in turn notifies the Operator server (step 9).

The Local Profile Assistant LPA is according to [1] [SGP.22] allowed to be resident either in the device or in the eUICC, is however usually provided in the device. The instance corresponding to the LPA in an IoT scenario according to [3] [SGP.31] GSMA SGP.31 eSIM IoT Architecture and Requirements Version 1.0, 19 Apr. 2022, is referred to as IoT Profile Assis-tant, IPA, and is also allowed to be either in the device or in the eUICC.

In document [1] [SGP.22], two types of Notifications are defined: Profile Installation Results, generated as an answer to the Profile installation, see section 2.5.6; and Other Notifications, generated due to the ‘NotificationConfigurationInformation’ data object defined in the “ES8+ .StoreMetadata” function. The eUICC SHALL manage the storage of these two types of Notification separately.

A Notification according to document [1] [SGP.22] is made up of the following fields: —Sequence Number (generated by the eUICC); —Profile Management Operation (i.e. the event whose occurrence SHALL be notified); —Recipient Address; —ICCID; —Additional data in case of a Profile Installation Result, see section 2.5.6; —eUICC signature.

As per the definition in document [1] [SGP.22], in that the Notification is a report to a remote entity (Recipient Address), an online connection is required between the eUICC and the re-mote entity in order that the Notification can be sent from the eUICC to the remote entity, as intended in [1]. For the Notification to the Operator according to [1] [SGP.22], an online connection to the Operator server is required.

The Procedure of Notification is described in [1] [SGP.22] as follows, for the case of an LPA resident in the device, LPAd:

1. The LPAd queries the eUICC for the Pending Notifications List.
2. The eUICC provides the LPAd with the Pending Notifications List.
3. The LPAd establishes a TLS secure channel with the relevant SM-DP+.
4. The LPAd sends each Notification to the SM-DP+.
5. The SM-DP+ acknowledges Notification reception.
6. The LPAd calls the “ES10b.RemoveNotificationFromList” function.
7. The eUICC removes the Notification from the Pending Notifications List.

From the described procedure it is visible that the eUICC, in order to be able to provide Notifications to a remote recipient embodied as an SM-DP+ server, requires connection to an LPA and to the SM-DP+.

Beyond the Remote Provisioning of an eUICC from a remote profile server SM-DP+, as de-scribed in [1] [SGP.22], the additional use case of In-Factory Provisioning is gaining increasing importance. In In-Factory Provisioning, a profile is downloaded to an eUICC, not from a remote profile server SM-DP+, however instead from a local Personalization Equipment residing in a secure production environment of an eUICC manufacturer who manufactures the eUICC. In In-Factory Provisioning, no online connection of the eUICC to a remote profile server SM-DP+ is available, and no online connection to the Operator (or the Operator sever) is available. Therefore, the sending of Notifications from the eUICC to a remote entity, particularly to an Operator (server) or MNO, as provided for in [1] [SGP.22], is not possible.

Furthermore, one scenario of In-Factory Provisioning is the provisioning of an eUICC which is not mounted to a mobile device yet, however is provisioned from the Personalization Equipment via an eUICC reader coupled to or integrated to the Personalization Equipment. The Personalization Equipment in turn can for example be part of a production machine for manufacturing eUICCs. Without the eUICC being mounted to a mobile device, and the Local Profile Assistant LPA or IoT Profile Assistant IPA mostly being provided in the mobile device, the eUICC doesn't have access to an LPA or IPA for providing Notifications to a remote entity.

The current solution for providing to the Operator Notifications from eUICCs that were pro-visioned by In-Factory Provisioning is to only generate the contents (fields contents) for the Notifications (e.g. Sequence number, Profile Management Operation, Recipient Address, ICCID, e.g. as in [1]), or the Notifications (e.g. Profile Installations Result) in the eUICC during the In-Factory Provisioning, essentially as during Remote Provisioning according to [1] [SGP.22], and to postpone the sending of Notifications to the Operator. Only later, when the eUICC is taken into service in a mobile device for the first time, the generated Notifications are sent via the LPA or IPA and the SM-DP+ to the Operator over an online connection, essentially as during Remote Provisioning according to [1] [SGP.22].

Document [3] [SGP.31] GSMA SGP.31 eSIM IoT Architecture and Requirements Version 1.0, 19 Apr. 2022, similar to document [1] [SGP.22], also addresses the entities of the Opera-tor server and the SM-DP+ server, and an ES2+ communication connection between the Operator server and the SM-DP+ server.

The above described current solution has the disadvantage of delayed notification of the Operator of profiles downloaded and installed to an eUICC in an offline provisioning mode, for example in In-Factory Provisioning. In case the eUICC provisioned offline with a profile remains unused for a long time, the Operator is kept unaware of the downloaded profile for a long time. Inconsistent information about downloaded profiles at different remote entities can result. For example, a first instance of a remote entity which is a profile server SM-DP+ having produced (generated) a profile and provided it to the Personalization Equipment for download to an eUICC, may have different information on downloaded profiles as compared to a second instance of a remote entity which is an Operator server (Mobile Network Operator MNO server) operated by an Operator owning the profile. Such inconsistencies can cause errors in later profile downloads, for which reason such inconsistencies between different remote entities (profile servers like SM-DP+, Operator or MNO servers, possibly further re-mote entities) on downloaded profiles and on related information should be avoided.

Besides, the delayed remote sending of a Notification by the end user over an online connection, on the occasion that the end user takes into operation its device in the field for the first time, may cause transaction costs for the end user for making use of the online connection for data transmission, and should therefore be avoided as well.

Objective of the Invention

It is an object of the present invention to provide a solution that enables to provide Notifications, referring to an eUICC to which a profile is downloaded, to a remote entity like an Operator or Mobile Network Operator, timely after the profile has been downloaded to the eUICC, also in the case when the profile is downloaded to the eUICC offline, for example by In-Factory Provisioning.

SUMMARY OF THE INVENTION

The object of the invention is achieved by a method with the following features, according to claim 1. Embodiments of the invention are presented in dependent claims.

The invention provides a method of providing to a remote entity a Notification referring to a profile download to an eUICC, comprising the following steps:

- Download a profile to the eUICC from a Personalization Equipment, wherein the Personalization Equipment is constructed to effect or to support: to provision eUICCs by one or sever-al of: downloading profiles, installing downloaded profiles in eUICCs or supporting such installing, and personalizing eUICCs and/or profiles downloaded to eUICCs or supporting such personalizing;
- After the profile download, generate at least one Notification referring to the profile down-load;
- Provide the generated at least one Notification for sending it to a remote entity.

The method is characterized by the feature: —Generate and Provide the at least one Notification at the Personalization Equipment.

In that the Notification is generated by the Personalization Equipment, instead of by the eUICC or by the LPA/IPA, the Notification is available for providing it to an arbitrary entity outside the eUICC at any time. It is not required to set the eUICC into operation for providing the Notification to a desired entity, for example an Operator server.

Accordingly, the present invention provides a solution that enables to provide Notifications, referring to an eUICC to which a profile is downloaded, to a remote entity like an Operator or Mobile Network Operator, timely after the profile has been downloaded to the eUICC, also in the case when the profile is downloaded to the eUICC offline, for example by In-Factory Provisioning.

A feature indicating that a first entity, for example the Personalization equipment, supports some action, wherein the action can be for example provisioning, downloading profiles, in-stalling profiles, personalizing eUICCs, personalizing profiles, is meant in that at least one other entity in addition to the first entity, e.g. Personalization Equipment, is involved in the action (provisioning, . . . ), wherein either the first or the other entity can have the lead in the action.

According to some embodiments of the invention, at least one of the at least one Notification is or comprises a profile download result notification, which is a Notification to notify the Operator that the Profile is downloaded.

According to some embodiments of the invention, the profile download to the eUICC is followed by one or several of the following actions:

Install the downloaded profile in the eUICC;

Personalize the downloaded profile in the eUICC;

wherein the Notification is or comprises, or a separate Notification is generated for each, one or several of the following:

A profile download result notification generated after the profile download, which is a report to notify the Operator that the Profile is downloaded;

A profile installation result notification generated after the profile installation, which is a report on a result of the profile installation;

A profile personalization result notification generated after the profile personalization, to report on a result of the profile personalization.

According to some embodiments of the invention, the Personalization Equipment is controlled by a production software constructed to effect or support to provision eUICCs by one or several of the following:

downloading profiles;

installing downloaded profiles in eUICCs or supporting such installing; and/or personalizing eUICCs and/or profiles downloaded to eUICCs or supporting such personalizing;

wherein the at least one Notification is generated by a notification generation entity which is incorporated into or communicatively coupled to the production software.

According to some embodiments of the invention, the at least one Notification provided on the Personalization Equipment is transmitted from the Personalization Equipment to a remote entity, wherein the remote entity is either one or several of:

An Operator server;

A profile server;

An SM-DP+profile server.

A feature indicating that an entity is "several of", followed by several entities, indicates that the single entity implies several functionalities that can as an alternative also be embodied by separate entities. For example, according to [5] SGP.02, a Data Preparation server SM-DP and a Secure Router SM-SR are provided as separate entities, whereas according to [1] SGP.22, the functionalities of the Data Preparation server and the Secure Router are both integrated into the single entity of the SM-DP+ server.

According to some embodiments of the invention, two or more Notifications are generated and provided as described in the foregoing, wherein the two or more Notifications are merged into an Output file, wherein the Output file is provided for sending it to a remote entity, instead of or in addition to the separate Notifications.

The Output file can comprise either one or both of:

two or several different Notifications referring to the same eUICC;

two or several similar Notifications referring to different eUICCs.

In detail, the Output file can comprise two or several different Notifications referring to the same eUICC.

Alternatively, the Output file can comprise two or several similar Notifications referring to two or several different eUICCs, wherein for each eUICC one similar Notification is provided. The two or several eUICCs can belong to a batch of eUICCs, and the Output file can comprise two or several or all similar Notifications of the entire Batch of eUICCs, herein comprising one Notification per one eUICC.

Alternatively, the Output file can comprise two or several different Notifications referring to the same eUICC, and in addition comprise Notifications of two or several different eUICCs. The two or several eUICCs can belong to a batch of eUICCs, and the Output file can comprise two or several or all Notifications of the entire Batch of eUICCs, wherein two or several Notifications are contained in the Output file for each eUICC.

According to some embodiments of the invention, the at least one Notification, and/or Out-put file, is provided to the remote entity using the function ES2+.HandleDownloadProgressInfo according to GSMA SGP.22, or in analogy to GSMA SGP.22, herein operating an ES2+ or ES2+ like connection between the Personalization Equipment or the production software on the one hand, and the Operator (Operator server) on the other hand.

BRIEF DESCRIPTION OF THE DRAWINGS

Embodiments of the invention will now be described with reference to the accompanying drawings, throughout which like parts are referred to by like references, and in which represents:

FIG. 1 an operational chart showing Notification generation and transmission in an In-Factory-Personalization profile download setup, according to an embodiment of the present invention.

DETAILED DESCRIPTION OF THE INVENTION

FIG. 1 shows an operational chart showing Notification generation and transmission in an In-Factory-Personalization profile download setup, according to an embodiment of the present invention. The setup comprises an eUICC, a Personalization Equipment, a production soft-ware, a profile server embodied as an SM-DP+ server, and an Operator (Operator server).

The Personalization Equipment and the production software are arranged in a certified pro-duction environment of an eUICC manufacturer or eUICC programmer.

The SM-DP+ server and the Operator are not arranged in the production environment, how-ever can be communicatively accessed by the Personalization Equipment and/or the production software, for example via a suitable secured wirebound or wireless internet connection.

The eUICC is communicatively coupled to the Personalization Equipment, for example by an eUICC reader incorporated into or coupled to the Personalization Equipment. The eUICC need not be inserted into a mobile device yet, and is not required to have ability to communicate to the SM-DP+ server itself.

The Personalization Equipment is controlled by the production software.

A Notification is preferably made up of the following fields as proposed by [1] [SGP.22]:

Sequence Number (generated by the eUICC; or can in combination with the present invention be generated by the Personalization Equipment or the production software instead, optionally followed by synchronization with the eUICC)

Profile Management Operation (i.e. the event whose occurrence SHALL be notified; for example profile download)

Recipient Address (for example Operator/Operator server)

ICCID (profile number)

Additional data in case of a Profile Installation Result, eUICC signature, wherein a private key of the eUICC, the eUICC private key, is required to generate the eUICC signature.

Herein, the Personalization Equipment or the production software initiates the eUICC to generate a sequence number and provide it to the Personalization Equipment, or the Personalization Equipment or the production software generates the eUICC sequence number itself.

The Personalization Equipment or the production software already has, or alternatively retrieves, the eUICC private key required for later signing the Notification.

According to some embodiments, the Personalization Equipment or the production software has or retrieves the eUICC private keys of multiple eUICCs.

The Personalization Equipment or the production software also generates the eUICC signature using the eUICC private key.

The Personalization Equipment or the production software generates a Notification in form of a ProfileInstallationResults file according to [1] [SGP.22], on behalf of the eUICC, and generates from the generated Notification ProfileInstallationResults file a derived or forwarded Notification, on behalf of the Local Profile Assistant LPA or IoT Profile Assistant IPA. Alternatively, the Personalization Equipment or the production software directly generates the Notification normally generated by the LPA/IPA, based on eUICC information received from the eUICC and forwarded to the LPA/IPA.

The Notification in form of a ProfileInstallationResults file comprises:

the received or generated sequence number;

as an indication of a Profile Management Operation: the information profile download;

as a Recipient Address: an address of the Operator server;

the ICCID (profile number) of the downloaded profile;

Optional, in case the profile was already installed: additional data in on a Profile Installation Result;

the eUICC signature generated by the Personalization Equipment or the production software, using the eUICC private key.

The Notification in form of a ProfileInstallationResults can be further be processed, so as to be in the form of a Notification as in the prior art normally generated by the LPA or IPA.

The Personalization Equipment or the production software generates, from the Notification, the Output file, which can imply further processing of the Notification.

The Personalization Equipment or the production software sends the Output file to the Operator.

The Operator imports the relevant information from the Output file into the SM-DP+ profile server.

According to alternative embodiments, the Personalization Equipment or the production software sends the Output file also directly to the SM-DP+ profile server.

The method of an embodiment according to FIG. 1 comprises the following steps [1]-[6]:

Step [1]

The Personalization Equipment downloads a profile to the eUICC, and may send to the eUICC one or several Command APDUs in connection with the profile download. The pro-file is provided in the form of a BLOB, Binary Large Object. In the following, the Personalization Equipment will generate several Notifications on the profile download, and subsequently create an Output file (which is a special batch file) including all generated Notifications.

The eUICC may send to the Personalization Equipment one or several Response APDUs in response to received Command APDUs.

Optionally, the downloaded profile is installed in the eUICC.

Step [2]

The Personalization Equipment personalizes the downloaded profile, updates the sequence number or retrieves an updated sequence number from the eUICC, and as required retrieves the required eUICC certificates. The Personalization Equipment may send to the eUICC one or several Command APDUs in connection with the profile personalization.

The eUICC may send to the Personalization Equipment one or several Response APDUs in response to received Command APDUs.

Steps [1]-[2] can be executed at two or several eUICCs in communication connection with the Personalization Equipment.

Step [3]

The Personalization Equipment provides to the production software eUICC production information such as the updated sequence number and the eUICC private key, and information on the downloaded profile such as ICCID. Such information can be provided for two or several eUICCs.

Step [4]

In case the profile was installed, the production software generates the Notification Profile InstallationResults.

The production software generates the Notification on the profile download.

In the embodiment of FIG. 1, Notifications for several eUICCs are generated, and an Output file comprising several Notifications for several eUICCs is generated.

Step [5]

The Output file including all Notifications is provided to the Operator.

Several Output files for different Operators can be provided.

Step [6]

Important information contained in the Notifications is exchanged between the Operator and SM-DP+ server which has generated the respective downloaded profile.

The following section shows an exemplary program sequence for Notification handling.

```
@ startuml
hide footbox
skinparam sequenceMessageAlign center
skinparam sequenceArrowFontSize 11
skinparam noteFontSize 11
skinparam monochrome true
skinparam lifelinestrategy solid
participant "<b>Operator" as OP
participant "<b>SM-DP+" as DP
participant "<b>Production SW" as PS
participant "<b>Personalization Equipment" as TER
participant "<b>eUICC" as E
TER->E: [1] Download Profile (e.g. hex blob)\n APDU x N
E-->TER: Response APDU x N
TER->E: [2] Personalize Profile, update sequence number, eUICC certificate . . . \An
APDU x N
E-->TER: Response APDU x N
```

TER->PS: [3] eUICC production information, eUICC dataset
mote right DP #FFFFFF
[4]
[Generate ProfileInstallationResults—OPTIONAL]
Generate Notifications per eUICC
Create output (batch) file including all Notifications
endrnote
PS->OP: [5]Output file (incl. Notifications)
mote left PS #FFFFFF
[6] Exchange and Import Notification Data. Not specified.
Endrnote
@enduml

CITED DOCUMENTS

[1] [SGP.22] GSMA SGP.22 RSP Technical Specification Version 2.2.2, 5 Jun. 2020
[2] [SGP.22 v3.0 Draft] GSMA RSP Technical Specification Version 3.0 Draft (unpublished at the date of filing the application)
[3] [SGP.31] GSMA SGP.31 eSIM IoT Architecture and Requirements Version 1.0, 19 Apr. 2022
[4] [SGP.32] GSMA SGP.32 eSIM IoT Technical Specification (unpublished at the date of filing the application)
[5] [SGP.02] SGP.02—Remote Provisioning Architecture for Embedded UICC Technical Specification, Version 4.2, 7 Jul. 2020

The invention claimed is:

1. A method of providing to a remote entity a notification comprising information about a profile download to an eUICC, comprising:

downloading a profile to the eUICC from a personalization equipment, wherein the personalization equipment is configured to provision one or more eUICCs by one or more of:

downloading one or more profiles, installing at least one of the one or more profiles in at least one of the one or more eUICCs, supporting said installing, personalizing the one or more eUICCs, personalizing at least one of the one or more profiles to at least one of the one or more eUICCs, and/or supporting said personalizing of the one or more eUICCs and/or the at least one of the one or more profiles;

after downloading the profile, generating at least one notification comprising information about the profile download;

providing at the personalization equipment the at least one notification, wherein the personalization equipment is configured to send the at least one notification to a remote entity;

wherein the at least one notification is generated by the personalization equipment prior to the eUICC being taken into service in a mobile device.

2. The method according to claim 1, wherein at least one of the at least one notification comprises a profile download result notification, which comprises a notification to notify an operator that the at least one profile is downloaded.

3. The method according to claim 1, wherein the method further comprises, after downloading the profile, one or more of:

installing the profile in the eUICC;

personalizing the profile in the eUICC;

wherein the at least one notification comprises, or a separate notification is generated for each, one or more of the following:

a profile download result notification generated after downloading the profile, wherein said profile download result notification comprises a report to notify an operator that the profile is downloaded;

a profile installation result notification generated after installing the profile, wherein said profile installation result notification comprises a report on a result of the profile installation;

a profile personalization result notification generated after personalizing the profile, wherein said profile personalization result notification comprises a report on a result of the profile personalization.

4. The method according to claim 1, wherein the personalization equipment is controlled by a production software, the production software being configured to provision eUICCs by one or more of the following:

downloading one or more profiles;

installing the one or more profiles in eUICCs or supporting said installing; and/or personalizing eUICCs and/or one or more profiles downloaded to eUICCs or supporting said personalizing;

wherein the at least one notification is generated by a notification generation entity which is incorporated into or communicatively coupled to the production software.

5. The method according to claim 1, wherein the at least one notification provided on the personalization equipment is transmitted from the personalization equipment to a remote entity, wherein the remote entity is either one or more of:

an operator server;

a profile server;

an SM-DP+ profile server.

6. The method according to claim 1, wherein two or more notifications are generated and provided, and wherein the two or more Notifications are merged into an output file, wherein the output file is provided for sending it to a remote entity, instead of or in addition to the two or more notifications.

7. The method according to claim 6, wherein the output file comprises either one or both of:

two or several different notifications referring to the same eUICC;

two or several similar notifications referring to different eUICCs.

8. The method according to claim 6, wherein the at least one notification, and/or output file, is provided to the remote entity using the function ES2+.HandleDownloadProgressInfo according to GSMA SGP.22, or in analogy to GSMA SGP.22, herein operating an ES2+ connection, or ES2+ like connection, between the personalization equipment on one side and the remote entity on another side.

9. The method according to claim 1, wherein the personalization equipment is part of a production machine for manufacturing eUICCs.

10. The method according to claim 1, wherein downloading the profile comprises downloading the profile offline by in-factory provisioning.

11. The method according to claim 1, wherein the method further comprises timely sending the at least one notification to the remote entity.

12. The method according to claim 1, wherein the personalization equipment is arranged in a certified production environment of an eUICC manufacture or eUICC programmer.

13. The method according to claim 1, wherein the remote entity is not arranged in a production environment.

14. The method according to claim 1, wherein the remote entity is communicatively connected to the personalization equipment via a secured wirebound or wireless internet connection.

15. The method according to claim 1, wherein the method further comprises communicatively coupling the eUICC to the personalization equipment.

16. The method according to claim 1, wherein information about the profile download comprises one or more of the following: Sequence number, profile management operation, recipient address, ICCID, and/or eUICC signature.

17. The method according to claim 1, wherein the method further comprises acquiring, by the personalization equipment, an eUICC private key from the eUICC and signing the at least one notification.

18. The method according to claim 17, wherein signing the at least one notification comprises generating an eUICC signature using the eUICC private key.

19. The method according to claim 1, wherein generating at least one notification comprises, by the personalization equipment, directly generating at least one notification based on eUICC information received from the eUICC and forwarded to an LPA/IPA.

20. A non-transitory hardware storage device having stored thereon computer executable instructions which, when executed by one or more processors of a computer system, configure the computer system to perform the method according to claim 1.

* * * * *